April 24, 1962  L. GRIFFITHS ET AL  3,031,592
EDDY-CURRENT BRAKES
Filed Aug. 8, 1960  4 Sheets-Sheet 1

INVENTORS
LEONARD GRIFFITHS
REGINALD T. COE
ATTORNEY

INVENTORS
LEONARD GRIFFITHS
REGINALD T. COE
ATTORNEY

April 24, 1962    L. GRIFFITHS ET AL    3,031,592
EDDY-CURRENT BRAKES
Filed Aug. 8, 1960    4 Sheets-Sheet 3

INVENTORS
LEONARD GRIFFITHS
REGINALD T. COE

ATTORNEY

INVENTORS
LEONARD GRIFFITHS
REGINALD T. COE
ATTORNEY

United States Patent Office 3,031,592
Patented Apr. 24, 1962

---

3,031,592
EDDY-CURRENT BRAKES
Leonard Griffiths, Coventry, and Reginald Thornton Coe, Rugby, England, assignors to Associated Electrical Industries Limited, London, England, a British company
Filed Aug. 8, 1960, Ser. No. 48,054
Claims priority, application Great Britain Aug. 25, 1959
3 Claims. (Cl. 310—93)

The present invention relates to eddy current brakes of the kind in which a rotor affixed to a shaft to be braked is rotatable in a magnetic field which, on rotation of the rotor in the field, generates eddy currents in the rotor which provides a breaking effect thereon.

It has been usual, in eddy current brakes of the kind set forth, to provide the required magnetic field by means of a plurality of separate electro-magnetic pole pieces of opposite polarity arranged with their axes lying on a circle concentric with the axis of the rotor, the pole pieces being presented to the surface of a rotor disc which is normal to the axis of the rotor. This necessitates the provision of a plurality of coils each arranged to magnetise one of the pole pieces. It has been shown, in the specification of U.S. application, Serial No. 749,830, filed on July 21, 1958 by us and assigned to The British Thomson-Houston Company Limited, that this requirement may be avoided and a single coil used for magnetising a magnetic-field producing member if a homopolar construction is employed with concentric pole-pieces of opposite polarity presented to the surface of a rotor disc.

For some purposes, the use of a homopolar construction is less advantageous than one in which alternate poles of opposite polarity are presented to the surface of a rotor disc, although the use of a single energising coil is always to be desired.

The present invention enables these desirable features to be combined.

In an eddy current brake of the kind above set forth, according to the invention, a magnetic field-producing member co-operating with the rotor is constituted of inner and outer annular rings between which is located an energising coil, the outer ring having pole pieces projecting inwardly therefrom at both sides of the coil, and the inner ring having pole pieces projecting outwardly therefrom on both sides of the coil, the pole pieces on the inner ring being interspersed with those in the outer ring so that when the coil is energised the pole pieces on both sides of the coil are of alternate opposite polarity.

Preferably alternate pole pieces projecting from the outer and inner rings which are located respectively at the one and the other side of the coil, are made integral with the rings, the remaining pole pieces being secured to the rings in any convenient manner. By this means the assembly of the magnetic field producing member is facilitated, since the rings can be assembled readily with the coil between the pole pieces projecting from the rings which are integral therewith. The remaining pole pieces are then secured to the rings by means of bolts which complete the assembly of the magnetic field producing members as an integral part.

Conveniently, the pole pieces extend from the rims of the rings, recesses being present between alternate pole pieces at opposite sides of the outer ring to provide air-gaps between the outer ring and the pole pieces outwardly projecting from the inner ring, while the pole pieces projecting inwardly from the outer ring are provided with non-magnetic spacers at their ends adjacent the inner ring.

Preferably, the pole pieces projecting from each ring on one side of the coil are staggered with relation to those projecting from the ring on the other side of the coil.

The pole pieces are preferably so shaped that substantial radial air-gaps are present between adjacent pole pieces, these air-gaps also forming passages for the flow of cooling air induced by the rotation of the rotor with relation to the stator of which the magnetic field-producing members form part.

The invention will now be described with the aid of the accompanying drawings, in which.

Figure 1:
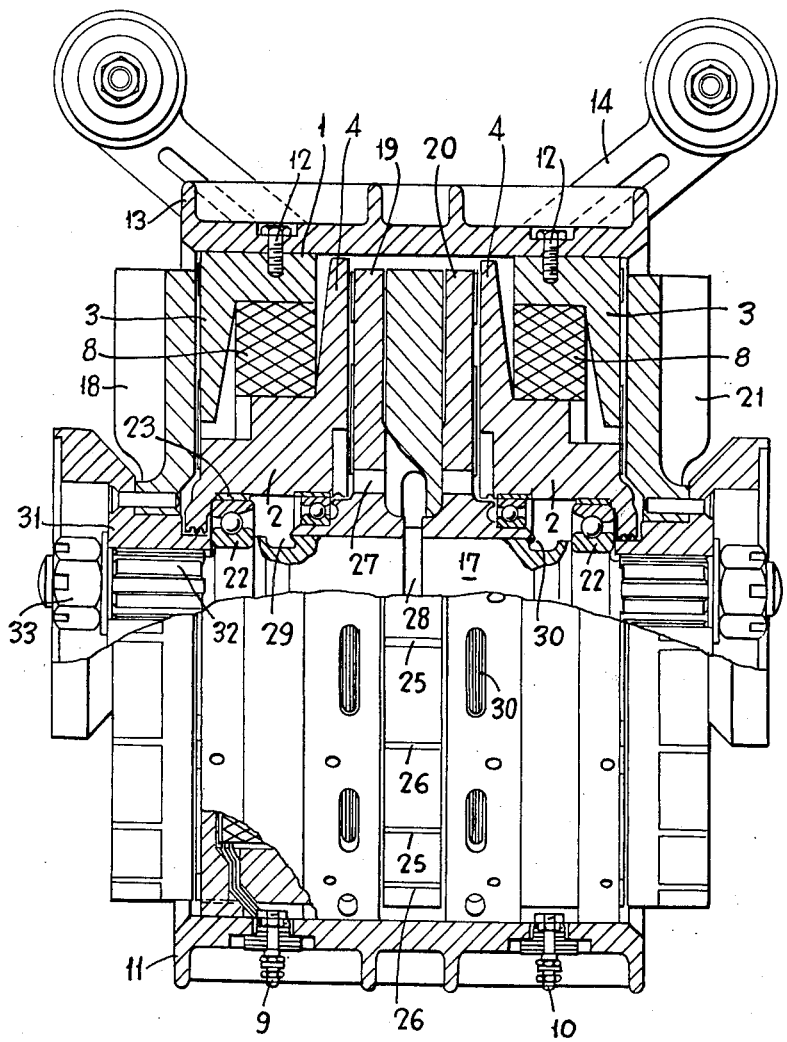
FIG. 1 shows, partially in cross-section, an eddy current brake constructed in accordance with the invention, the section being taken in a plane containing the axis of the rotor.

Referring to the drawings, the eddy current brake comprises a stator member constituted by two magnetic-field-producing members and a rotor rotatably mounted with reference to the stator. The magnetic-field-producing members are each of the same construction and are spaced apart axially of the shaft forming part of the rotor. Each magnetic-field-producing member consists of outer 1 and inner 2 annular rings of magnetic material, such as soft iron, having salient pole pieces 3, 4, respectively, extending radially therefrom. The pole pieces 3 project inwardly from the outer ring 1 and the pole pieces 4 project outwardly from the inner ring 2. The pole pieces are so shaped as to provide substantially radial slots between them. The construction of the magnetic-field-producing members will be described in detail hereinafter; meanwhile, the construction of the brake as a whole, will first be referred to.

In the annular space provided between rings 1, 2, and pole pieces 3, 4 is located an excitation winding 8. The excitation winding is adapted to be connected to a source of energising voltage, according to the excitation required. One terminal of each excitation winding is earthed to the casing and the other ends are connected to terminals 9 and 10 (see FIG. 2), the terminals being mounted on an outer housing 11 which is secured to the outer ring by means of set bolts 12. The housing is provided with ribs 13 which serve to protect the terminals 9, 10 from damage and increase the stiffness of the housing. The housing is shown as being provided with projecting ears 14 by which it can be secured to a stationary mounting 15 through the intermediary of a resilient bushing 16.

Within the stator is mounted a rotor member comprising a shaft 17 and the pairs of rotor discs 18, 19, and 20, 21, non-rotatably secured to the shaft. The shaft is mounted in bearings 22, shown as being in the form of ball bearings, each bearing being located within a recess 23 formed at the inner periphery of the inner ring 2. The recesses for the bearings may be lined with a steel or brass bush cast integrally with the end plates.

With each of the magnetic-field-producing members is associated a pair of rotor discs, 18, 19 being associated with the left-hand magnetic-field-producing member, and 20, 21 being associated with the right-hand member. The rotor discs 19, 20 of each pair are located in proximity to one another, the inner face of the rotor disc 19 being provided with radial ribs 25 which are inter-leaved with the corresponding ribs 26 on the proximate disc 20. The rotor discs 19, 20 are each provided adjacent their inner periphery with apertures 27 through which cooling air can enter the space between the rotor discs, the ribs of the rotor disc promoting an outward flow of air from between them. The apertures 27 lead from the interior of the magnetic-field-producing members.

Rotor discs 19, 20 are secured to the shaft 17 in the following manner: an annular projection 28 is formed on the shaft and provides opposed shoulders against which the discs 19, 20 are seated. The projection may be integral with or in the form of a collar shrunk on the shaft. In order to secure the discs non-rotatably on the shaft, the shaft is provided with spaced annular recesses 29 each of which is constructed to provide an annular tongue 30 to which a rim on the inner periphery of the discs 19, 20 is secured by welding. The other, and outer one 18 of the pair of rotor discs 18, 19 associated with the left-hand magnetic-field-producing member is secured to shaft 17 through the intermediary of a coupling member 31 which is splined at 32 to the shaft 17, the coupling member 31 being held upon the shaft by a nut 33 screwed on to the end of the shaft. A similar means is adopted for securing the outer rotor disc 21 on shaft 17. The coupler members are coupled to adjacent ends of a shaft to be braked.

Figure 2:
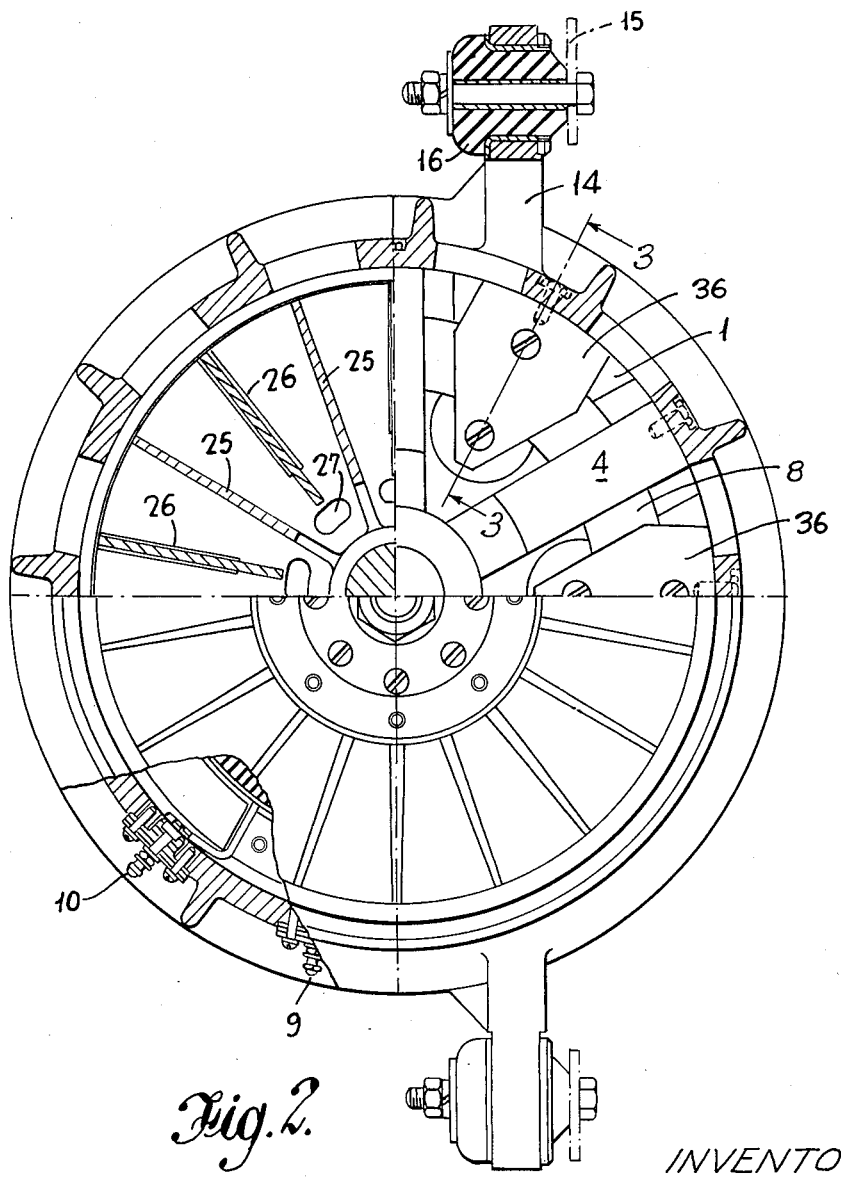
FIG. 2 is an end view partially in cross-section of FIG. 1, taken from the rght.
Figure 4:
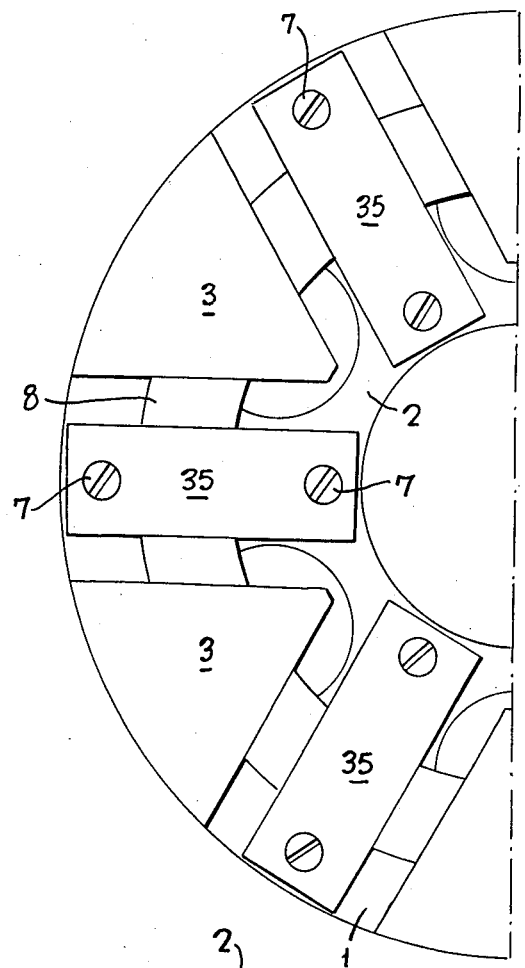
FIG. 4 is an end view of one half of a magnetic-field-producing member taken from the left in FIG. 1.
Figure 3:
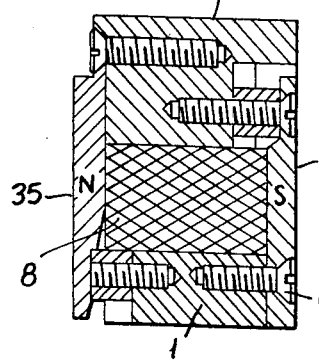
FIG. 3 is a cross-section on the line 3—3 of FIG. 2.
Figure 5:
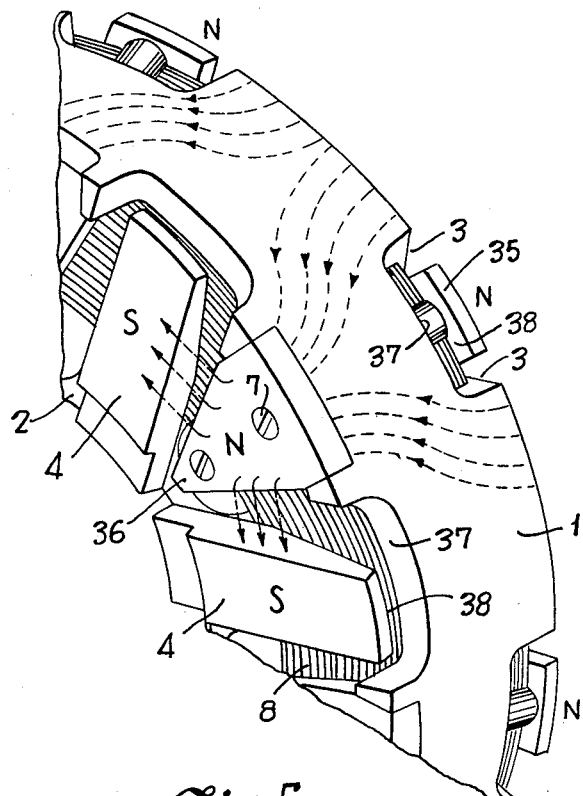
FIG. 5 is a perspective view of part of a magnetic-field-producing member, showing the direction of the lines of magnetic flux therein.

In order that the construction of the magnetic-field-producing members may be readily perceived, the perspective view of one of the members given in FIG. 5 may be considered in conjunction with FIGS. 2, 3 and 4. The outer annular ring 1 is provided with inwardly-directed pole pieces which extend from the rims of the ring to lie on either side of the excitation winding 8. The inwardly-directed pole pieces 3 located on one side of the coil, shown as the right-hand side in FIG. 5, are formed integrally with the outer ring, while the outwardly-directed pole pieces 4 extending from the inner ring 2 and located on the other side of the excitation winding 8 are formed integrally with that ring. Between the pole pieces 3 are located pole pieces 35 which are removably secured to the inner ring and are thus in interspersed relation with those provided on the outer ring. Similarly projecting inwardly from the outer ring and interspersed between the pole pieces 4 secured to the inner ring are provided pole pieces 36 which are secured to the outer ring. The pole pieces projecting inwardly from the outer ring and lying on one side of the excitation winding 8 are thus seen to be in staggered relation to those lying on the other side of the coil. The pole pieces projecting outwardly from the inner ring are similarly staggered. The staggering of the pole pieces is not, however, essential.

The pole pieces extend from the rims of the rings, and in the outer ring are formed recesses 37 into which the pole pieces 4 and 35 on the inner ring project, thus forming air-gap 38 which provide a high magnetic reluctance in the path of flux flowing across them. The inner ends of the pole pieces 3 and 36 projecting from the outer ring are similarly spaced from the inner ring 2 to form air-gaps at the inner ends of those pole pieces.

When the excitation winding 8 is energised, magnetic lines of flux, indicated by the arrowed interrupted lines, are present, and as a result of the existence of air-gaps 38 the magnetic flux flows between the alternate pole pieces lying on opposite sides of the excitation winding which are thus made to be of alternate opposite polarity. Since the pole pieces are presented to the faces of the adjacent rotor discs, the magnetic flux entering the rotor discs varies in a substantially sine wave form continuously through the rotor disc, although only a single excitation winding is required for producing the flux in each magnetic-field-producing member.

The pole pieces are so shaped that substantially radial air-gaps are present between adjacent pole pieces. These radial air-gaps provide for the flow of cooling air between them when the rotor rotates, the flow of cooling air being induced by the presence of the radial vanes on the rotor discs. A convvenient way of achieving this result is to make the pole pieces 4 projecting from the inner ring 2 with parallel sides, while those projecting inwardly from the outer disc have sides which are divergent from the direction of the axis of the rotor.

The excitation winding 8 may be in the form of a continuous conductor. Alternatively the excitation winding may be wound simultaneously from parallel conductors which are provided with individual terminals at their outer ends, their inner ends being earthed to the disc 2.

If a single conductor winding is employed the current value is generally such that a contactor is required to close the circuit, said contactor being electro-magnetically operated from a switch. The multiple conductor coil enables a number of simple switches to be used and direct operation to be accomplished. Furthermore, if the switches are not ganged for simultaneous operation, the excitation and, therefore, the torque, may be graded by operating individual switches.

Cooling of the assembly is effected in the following manner: on rotation of the rotor relative to the stator a radially outward flow of air is produced by the ribs 25, 26 on the proximate discs 19, 20. This air is supplied by means of a radially inward flow through apertures 34 in the housing 11 which lead into the radial slots formed between the angularly separated salient poles 3, 4, on these members. The inwardly flowing air passes through the apertures 27 in the rotor discs 19, 20, to flow outwardly from the housing.

Whilst the construction illustrated has been shown as providing two pairs of rotor discs, each pair being associated with a single field producing member, it will be evident that, if desired, a further magnetic-field-producing member may be arranged axially along the shaft 17, the housing being extended to carry the additional magnetic-field-producing member with its associated pair of rotor discs. In this way a six-disc construction will be obtained and which may even be extended to an eight-disc construction should this prove necessary in order to achieve the desired power dissipation. Alternatively, a two-disc arrangement with a single magnetic-field-producing member may be used for lower braking torques.

By reason of the flux produced by each magnetic-field-producing member passing across the two air-gaps between the pair of rotor discs and the magnetic-field-producing member with which such pair is associated, the flux across the two air-gaps is the same, and the possibility of an unbalance, or resultant axial force on the rotor arising from inequality in the magnetic pulls excited by the members on the discs is minimised.

What we claimed is:

1. An eddy-current brake comprising a shaft, a rotor affixed to said shaft, a magnetic-field-producing member co-operating with said rotor, the magnetic field produced by said member being adapted to generate eddy currents in said rotor on relative rotation of said member and said shaft, said magnetic-field-producing member being constituted of inner and outer annular rings, an energizing coil located between said rings, pole pieces projecting inwardly from said outer ring at both sides of said coil, pole pieces projecting outwardly from said inner ring at both sides of said coil, recesses in said outer ring located between alternate pole pieces projecting therefrom to provide air-gaps between said outer ring and said pole pieces projecting outwardly from said inner ring, non-magnetic spacers located at the ends adjacent said inner ring of said pole pieces projecting inwardly from said outer ring, the pole pieces on said inner ring being interdigitable with said pole pieces on said outer ring, energization of said coil causing said pole pieces on both sides of the coil to be of alternate opposite polarity.

2. An eddy-current brake as claimed in claim 1, in which said pole pieces projecting inwardly from said outer ring at one side thereof and said pole pieces projecting outwardly from said inner ring at the other side thereof are made integral with said respective rings.

3. An eddy-current brake as claimed in claim 1, in which alternate ones of said pole pieces are parallel-sided while the remaining ones have sides divergent from the axis of said shaft.

References Cited in the file of this patent

UNITED STATES PATENTS

| | | |
|---|---|---|
| 2,503,704 | Bessiere | Apr. 11, 1950 |
| 2,836,742 | Bessiere | May 27, 1958 |

FOREIGN PATENTS

| | | |
|---|---|---|
| 108,970 | Sweden | Nov. 9, 1943 |
| 1,088,310 | France | Sept. 8, 1954 |